(12) United States Patent
Deb et al.

(10) Patent No.: US 8,559,917 B1
(45) Date of Patent: Oct. 15, 2013

(54) METHOD, APPARATUS AND COMPUTER READABLE MEDIUM FOR ASSOCIATING USER EQUIPMENT WITH A CELL

(75) Inventors: Supratim Deb, Somerset, NJ (US); Pantelis Monogioudis, Randolph, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/435,388

(22) Filed: Mar. 30, 2012

(51) Int. Cl.
*H04M 11/00* (2006.01)
(52) U.S. Cl.
USPC ............ 455/405; 455/446; 455/501; 455/450
(58) Field of Classification Search
USPC ................... 455/446, 405, 501, 450
See application file for complete search history.

(56) References Cited

U.S. PATENT DOCUMENTS

| 6,097,937 | A * | 8/2000 | Sawyer .......................... 455/406 |
| 2012/0113844 | A1* | 5/2012 | Krishnamurthy ............ 370/252 |
| 2012/0122440 | A1* | 5/2012 | Krishnamurthy et al. ..... 455/418 |
| 2012/0122472 | A1* | 5/2012 | Krishnamurthy et al. . 455/456.1 |
| 2012/0263247 | A1* | 10/2012 | Bhattad et al. ................ 375/260 |

\* cited by examiner

*Primary Examiner* — Danh Le
(74) *Attorney, Agent, or Firm* — Harness, Dickey & Pierce (57) ABSTRACT

The method includes determining one or more almost blank subframes (ABS) associated with a macro cell and associating a user equipment with one of the macro cell and a small cell using at least one of the one or more ABS based on one or more market prices associated with the small cell and the macro cell such that the determining and associating occurs jointly.

17 Claims, 6 Drawing Sheets

METHOD, APPARATUS AND COMPUTER READABLE MEDIUM FOR ASSOCIATING USER EQUIPMENT WITH A CELL

BACKGROUND OF THE INVENTION

1. Field

Embodiments relate to associating user equipment (UE) with macro cells and small cells in a wireless network.

2. Related Art

Heterogeneous wireless networks (HetNets) are deployments of cells with differing coverage radii within a single geographic area. A typical configuration is one where macro (e.g., large) cells provide contiguous coverage over the area while pico, femto or metro (e.g., small) cells cover smaller areas that are associated with either traffic hot spots or coverage holes. When both the macro cells and metro cells share the same carrier frequency, the deployment is called a co-channel or shared-carrier deployment.

For example, a HetNet may include macro base stations (BSs) and metro base stations BSs. Macro BSs provide wireless coverage for user equipment (UEs) within the macro cells which may cover large geographical areas, while metro BSs may provide wireless coverage for UEs located in the metro cells which may cover smaller geographical areas within the coverage are of a macro BS. Parameters needed to configure BSs within HetNets include patterns for and allocation of an almost blank subframe (ABS).

SUMMARY OF THE INVENTION

One embodiment includes a method. The method includes determining one or more almost blank subframes (ABS) associated with a macro cell and associating a user equipment with one of the macro cell and a metro cell using at least one of the one or more ABS based on one or more market prices associated with the small cell and the macro cell such that the determining and associating occurs jointly.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Overview of Network Architecture

Figure 1A:
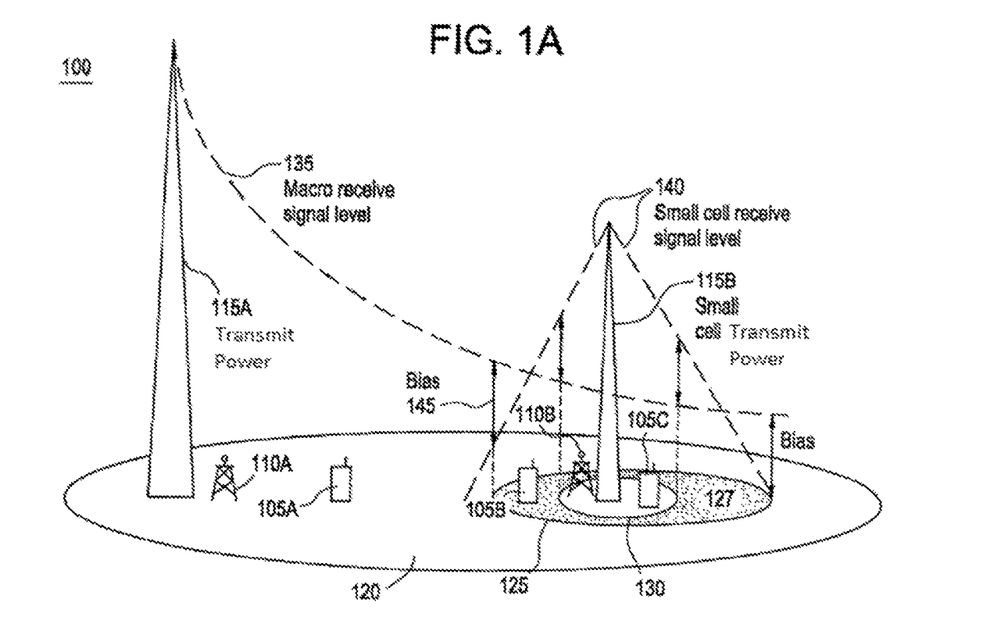
FIG. 1A is a diagram illustrating a portion of a wireless communications network according to at least one example embodiment.

FIG. 1A illustrates a portion of a wireless communications network 100. Referring to FIG. 1A, wireless communications network 100 may follow, for example, an LTE protocol. Communications network 100 includes a macro base station (BS) 110A; a small cell BS 110B; a macro cell 120, a small cell 125; and first through third UEs 105A-C. The small cell 125 may be, for example a pico cell, a femto cell or a metro cell. Further, the term small cell as used herein may be considered synonymous to and/or referred to as pico cell, a femto cell or a metro cell. The small cell 125 includes a cell range extended area (CRE) 127 and an in-cell area 130.

In the example illustrated in FIG. 1A, the first UE 105A is attached to the macro cell 120, and the second and third UEs 105B and 105C are attached to the small cell 125. Further, the second UE 105B is designated as a CRE UE and the third UE 105C is designated as an in-cell UE. As will be discussed in greater detail below, the attachment of UEs to either the macro cell 120 or the small cell 125 may be controlled by a cell selection bias (CSB) value 145.

Though, for the purpose of simplicity, communications network 110 is illustrated as having only macro BS 110A, small cell BSs 110B, and first through third UEs 105A-C, communications network 100 may have any number of macro BSs, small cell BSs and UEs. Further, the macro BS 110A and small cell BS 110B may be connected to other core network elements included in the communications network 100 including, for example, one or more mobility management entities (MME) and/or one or more operations, administration and management (OAM) nodes (not shown). Further, the MME may include the OAM node.

The macro BS 110 may be, for example, an evolved nodeB (eNB) providing wireless coverage for UEs within the macro cell 120. The small cell BS 110B may be, for example, an eNB underlaid with respect to the macro BS 110A. The small cell BS 110B may provide wireless coverage for UEs associated with the small cell 125 that supplements coverage provided by the macro BS 110A. Data, control signals and other information described herein as be sent and/or received by the macro cell 120 may be sent and/or received by the macro BS 110A. Further, operations described herein as being performed by the macro cell 120 may be performed by the macro BS 110A. Data, control signals and other information described herein as be sent and/or received by the small cell 120 may be sent and/or received by the small cell BS 110B. Further, operations described herein as being performed by the small cell 125 may be performed by the small cell BS 110B.

In general a transmit power of the macro BS 110A may be greater than a transmit power of the small cell BS 110B. Transmit powers 115A and 115B illustrate an example of the relative transmit powers of the macro BS 110A and the small cell BS 110B, respectively. Macro receive signal level 135 illustrates an example of a strength of a receive signal of the macro cell 120 measured by UEs within communications network 100. As is illustrated in FIG. 1A, in general, the strength of the macro receive signal level may drop as a distance from a location of the macro BS 110A increases. Small cell receive signal level 140 illustrates an example of a strength of a receive signal of the small cell 125 measured by UEs within communications network 100.

As is illustrated in FIG. 1A, in general, the strength of the small cell receive signal level 140 may drop as a distance from a location of the small cell BS 110B increases. Though, for the purpose of simplicity, macro and small cell signal levels 135 and 140 are described above and illustrated in FIG. 1A as having strengths which decrease along with an increased distance from a BS, macro and small cell signal strengths can be effected by any of a number of other factors in addition to distance including, for example, shapes and heights of buildings or physical structures within the coverage areas of macro cell 120 and small cell 125, and a number of UEs or an amount of UE traffic within a given region of the coverage area of the macro cell 120 or the small cell 125.

As one skilled in the art will appreciate (and indicated above), a small cell may be a pico, micro or metro cell. For example, a metro cell may imply an Open Subscriber Group (OSG) small cell(s), in that subscribers (e.g., a user of a UE) with valid subscriptions with an operator may (a) freely roam into the coverage area of a metro small cell and register with the network, if they are not already in a call. This procedure is typically called cell (re)selection procedure, and may (b) establish a traffic connection to the metro small cell if the subscribers are already in a call, a procedure called handover. Therefore, there may be an implicit association between a metro cell and the OSG and an implicit association between femto and Closed Subscriber Group (CSG). In CSG femto cells may include a selected group of subscribers that can perform cell (re)selection and handover procedures to/from the femto cell. Example embodiments are applicable to OSG, CSG and any arrangement in between such as a Hybrid Access (HA) where in between the two extremes access policies may be established by the mobile operator.

As one skilled in the art will appreciate, a BS may be a logical entity that incorporates transmitter and receiver functionality. Therefore, a base station may be physically embodied as a group of remote RF transmitting and receiving antennas, associated with those antennas remote radio heads (RRHs) and remote to the antenna and RRH centralized baseband cage or other physical arrangement familiar to those skilled in the art. A physical transmitting antenna may correspond to one or more coverage cells. Therefore a logical BS may be associated with more than one cell. The terms bases station (BS) may be used interchangeably in the descriptions below.

Explanation of the Cell Selection Bias (CSB) Value and Almost Blank Subframe (ABS) Parameters UEs in the communications network 100 that are within both a coverage area of the macro cell 120 and a coverage areas of the small cell 125 may be in communication with the communications network 100 via a wireless connection to either the macro BS 110A or one of the small cell BS 110B. A UE in communications network 100 makes a decision with respect to which of the macro cell 120 and the small cell 125 to be associated with by comparing the macro receive signal level 135 as measured by the UE to the small cell receive signal level as measured by the UE with use of a CSB value. For example, for a UE i currently attached to the macro cell 120, if MR(i)<PR(i)+B, where MR(i) is the macro signal strength 135 measured at the UE i, and PR(i) is the small cell signal strength 140 measured at the UE i, and B is the CSB 145, then UE i is handed over from the macro cell 120 to the small cell 125. The handover of the UE i may be performed according to known processes.

Accordingly, once a UE associated with the macro cell 120 determines that the macro receive signal level 135 is below the small cell receive signal level 140 plus a CSB value 145, the UE may initiate a hand-over operation from the macro cell 120 to the small cell 125 using known methods. As is illustrated in FIG. 1A, the points at which the macro receive signal level 135 is below the small cell receive signal level 140 plus the CSB value 145 define the boundaries of the small cell 125. Accordingly, the CSB value 145 may control an amount of UEs which are handed over from the macro cell 120 to the small cell 125 by controlling, for example, a tendency of the UEs to initiate a hand off operation.

When the macro cell 120 and the small cell 125 transmit data over downlink connections to associated UEs, the transmissions of the macro cell 120 may cause interference for UEs receiving data from the small cell 125 (e.g., those like the second UE 105B). Further, the transmissions of the small cell 125 may cause interference for UEs receiving data from the macro cell 120 (e.g., those like the first UE 105A). Accordingly, wireless communications network 100 implements an interference reduction scheme which includes dividing UEs attached to the small cell 125 into in-cell UEs and CRE UEs according to known methods. For example, for a UE i currently attached to the small cell 125, if PR(i)>MR(i), where MR(i) is the macro signal strength 135 measured at the mobile i, and PR(i) is the small cell signal strength 140 measured at the mobile i then UE i may be designated as an in-cell UE. Otherwise, if MR(i)–CSB<PR(i)<MR(i), the UE i may be designated as a CRE UE.

The wireless communication network 100 may implement the enhanced inter cell interference coordination (eICIC) scheme defined by, for example, the 3GPP Release 10 standards. For example, in order to reduce an amount of interference experienced by UEs receiving downlink transmissions, transmissions for UEs designated as CRE UEs (e.g, those like the second UE 105B in the CRE 127) may be scheduled at a different time from transmissions for UEs designated as in-cell UEs (e.g., those like the third UE 105C within the in-cell area 130) and UEs attached to the macro cell 120 (e.g., those like the first UE 105A within the macro cell 120 and outside the small cell 125). This feature will now be discussed in greater detail below with reference to FIG. 1B.

Figure 1B:
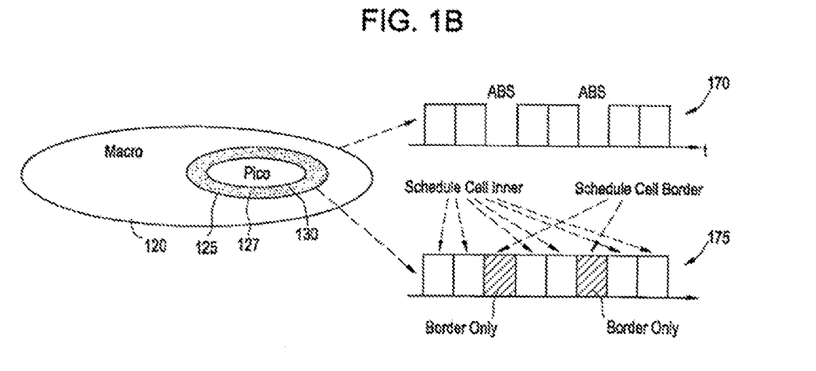
FIG. 1B is a diagram illustrating an example relationship between transmission schedules for macro and small cells.

FIG. 1B is a diagram illustrating an example relationship between transmission schedules for macro and small cells 120 and 125. Referring to FIG. 1B, first graph 170 illustrates subframes transmitted over time for the macro cell 120 and second graph 175 illustrates subframes transmitted over time for the small cell 125. As is illustrated by the first graph 170, the macro cell 120 may transmit downlink data on all frames except those designated as almost blank subframes (ABSs). As is illustrated by the second graph 175, the small cell 125 may transmit data to UEs designated as in-cell UEs on all frames except those designated as ABS frames.

Accordingly, the small cell 125 may transmit data to UEs designated as in-cell UEs following the same schedule as the macro cell 120. Further, as is illustrated by the second graph 175, the small cell 125 may transmit data to UEs designated as small cell border UEs on the subframes designated by the macro cell 120 as ABS subframes. In the example illustrated in FIG. 1B, an ABS pattern of the transmission schedules illustrated in first and second graphs 170 and 175 is configured such that every third subframe is designated as an ABS subframe. Accordingly, in the ABS pattern illustrated in FIG. 1B, there is a 2-to-1 ratio between non-ABS subframes and ABS subframes.

According to at least one example embodiment, in the wireless network 100, the ABS pattern may be determined by a BS within the wireless network 100 and communicated, by that BS, to other BSs within the wireless network 100. For example, the macro BS 110A may set an ABS pattern for downlink transmission in the macro cell 120 based on information stored in the macro BS 110A and information received from the small cell BS 110B. The macro BS 110A may then communicate the set ABS pattern to the small cell BS 110B so the small cell BS 110B can schedule downlink transmission in the small cell 125 based on the set ABS pattern. Alternatively, the small cell BS 110B may set an ABS pattern for downlink transmission in the small cell 125 based on information stored in the small cell BS 110B and information received from the macro cell BS 110A. The small cell BS 110B may then communicate the set ABS pattern to the macro BS 110A so the macro BS 110A can schedule downlink transmission in the macro cell 120 based on the set ABS pattern. Methods by which one or more BSs within the wireless network 100 can determine an ABS pattern will be discussed in greater detail below with reference to FIG. 2.

Though, in the example illustrated in FIG. 1A, the ABS pattern includes a 2-to-1 ratio between non-ABS subframes and ABS subframes, this is only an example, and the ABS pattern can include any ratio (i.e., duty cycle) between non-ABS subframes and ABS subframes including, for example, 4-to-3, 3-to-2, 3-to-1, 4-to-1, etc.

Associating User Equipment to Macro Cells, Small Cells and Almost Blank Subframes (ABS)

According to example embodiments, a dynamic price or market price may be used in determining associations between UEs 105, macro cells 120, small cells 125 and ABS. The dynamic price or market price includes different price variables that are maintained and updated. The price variables may be (1) macro BS prices, (2) small BS prices and (3) UE prices.

For example, each macro BS 110A maintains and updates two types of prices that the macro BS 110A charges: (1) a price UEs 105 may pay for association with the macro BS 110A and, (2) a price that may be paid by any small BS 110B that requires the macro BS 110A to be silent over ABS subframes.

For example, each small BS 110B may maintain and update three types of prices that the small BS 110B charges: (1) a price that UE's 105 may pay for small BS 110B association, (2) an additional price that UE's 105 may pay for using ABS subframes, and (3) a price that each interfering macro BS 110A may pay.

For example, each UE 105 may have a price the UE 105 is willing to pay (WTP) for association with BSs 110A, 110B and availing airtime resources.

General Methodology

According to example embodiments, the ABS offered by each macro BS 110A, and downlink airtime resources that UEs 105 avail from the macro BS 110A and small BS 110B (over ABS subframes and non-ABS subframes) may be more efficiently (or even optimized) based on current prices. The different prices may be updated based on current ABS/UE-airtime (downlink) such that the system approaches a desired or optimal utility. The price update and ABS/UE-airtime updates may be iteratively performed. Finally, the UE 105 associations may be mapped to Cell Selection Bias (CSB) values for each small BS 110B.

Any UE 105 may have achievable PHY rates to a macro BS 110A and nearest small BS 110B. For the small BS 110B each UE 105 may have two data rates, one with and one without ABS. This data rate may be determined using measurements available at the UE 105. For each small BS 110B, the set of macro BSs that interfere with the small BS 110B may be known. The ABSs offered by each macro BS 110A and a set of UEs 105 associated with each small BS 110B may be determined so as to maximize $\Sigma_u \log(R_u)$ where $R_u$ is the throughput (e.g., data rate) attained by UE-u and the summation is carried over all UEs 105 in the entire network. $\Sigma_u \log(R_u)$ may be maximized subject to association constraints, interference constraints and total airtime constraints.

The association constraints may be that a UE 105 can associate with either the macro BS 110A or a small BS 110B but not both. More precisely, fractional associations (e.g., associations with the macro BS 110A for 25% of the time and the small BS 110B for 75% of the time) are not allowed, only integral associations are allowed.

The interference constraint may be that the ABS subframes for a small BS 110B p is reserved by all macro BSs that interfere with the small BS 110B.

The total airtime constraints may be: the total airtime allocated to UEs 105 on an average should be less than the total subframes in a frame. This ensures that the throughputs (e.g., data rates) are achievable by the MAC scheduler.

According to example embodiments the general methodology for associating UE 105 to macro cells 120, small cells 125 and ABS may be performed in two steps. First, determine ABS subframes and airtimes while ignoring the integrality requirements on user UE 105's association to small BSs, and the number of ABS subframes offered by each Macro BS 110A. Second, round off the relaxed solution that allows fractional solutions, to a feasible integral solution taking into consideration (e.g., staying within) the above constraints.

Determining ABS Subframes and Airtimes while Ignoring the Integrality Requirements Variable definitions:

pr(m): price charged by macro-m to any UE for which macro-m is a candidate macro BS;

pr(p): price charged by small-p to any UE for who Pico-p is a candidate small BS;

A_pr(p): additional price charged by small-p to any UE that utilizes ABS subframes;

I_pr(p,m): interference price charged by small-p to any macro-m that interferes with small-p;

WTP(u): price that UE-u is willing to pay for a unit data rate;

NAS(m): non-ABS subframes/frame reserved by macro-m;

AS(p): ABS subframes used by small-p;

x(u): aggregate airtime (in subframes/frame) that UE-u gets from a candidate macro BS;

y(u): aggregate ABS airtime (in subframes/frame) that UE-u gets from its candidate small BS, if any; and z(u): aggregate non-ABS airtime (in subframes/frame) that UE-u gets from its candidate small BS.

Equations used for updating ABS subframes and airtimes:

$$\text{gain}(u,m) = \text{WTP}(u) * \text{PhyDataRateToMacro} - pr(m) \quad (1);$$

$$A\_\text{gain}(u,p) = \text{WTP}(u) * \text{PhyDataRateToSmallInABS} - (A\_pr(p) + pr(p)) \quad (2);$$

$$I\_\text{gain}(m) = pr(m) - \Sigma I\_pr(p) \quad (3);$$

where Σ is over all interfering small BSs of macro-m;

$$I\_\text{gain}(p) = pr(p) - \Sigma I\_pr(m) \quad (4);$$

where Σ is over all interfering macro BSs of small-p. Equations used for updating variables:

$$x(u)=(1-w)*x(u)+w*curr\_x(u) \quad (5);$$

$$y(u)=(1-w)*y(u)+w*curr\_y(u) \quad (6);$$

$$z(u)=(1-w)*z(u)+w*curr\_z(u) \quad (7);$$

$$NAS(m)=(1-w)*NAS(m)+w*curr\_NAS(m) \quad (8);$$

$$AS(p)=(1-w)*AS(p)+w*curr\_AS(p) \quad (9);$$

where: w is a smoothing variable that may be set to a small constant or, alternatively, set to 1/(IterationNo) as a dynamic quantity; and curr_variable (e.g., curr_x(u)) is the current value for the representative variable.

Equations used for updating prices (note: $[\ ]^+$ represents projection into the space of positive real numbers):

$$pr(m)=pr(m)+\text{step\_size}*[(\text{total curr}\_x(u) \text{ over all child } UE\text{-}u)\text{-}curr\_NAS(m)]^+ \quad (10);$$

$$A\_pr(p)=A\_pr(p)+\text{step\_size}*[(\text{total curr}\_y(u) \text{ over all child } UE\text{-}u)\text{-}curr\_AS(p)]^+ \quad (11);$$

$$pr(p)=pr(p)+\text{step\_size}*[(\text{total curr}\_z(u)+curr\_y(u) \text{ over all child } UE\text{-}u)\text{-}\text{NumSubframes}]^+ \quad (12);$$

$$I\_pr(m,p)=I\_pr(m,p)+\text{step\_size}*[curr\_NAS(m)+curr\_AS(p)\text{-}\text{NumSubframes}]^+ \quad (13);$$

$$WTP(u)=WTP(u)+\text{step\_size}*[1/WTP(u)\text{-avail-able\_throughput based on } curr\_x, curr\_y, curr\_z]^+ \quad (14);$$

According to example embodiments a method may include determining one or more almost blank subframes (ABS) associated with a macro cell 120 and associating a user equipment with one of the macro cell 120 and a small cell using at least one of the one or more ABS based on one or more market prices associated with the small cell 125 and the macro cell 120 such that the determining and associating occurs jointly. For example, the determining and associating is performed approximately simultaneously (e.g., in close proximity of time) and such that determining and associating may be a coupled solution.

Figure 2:
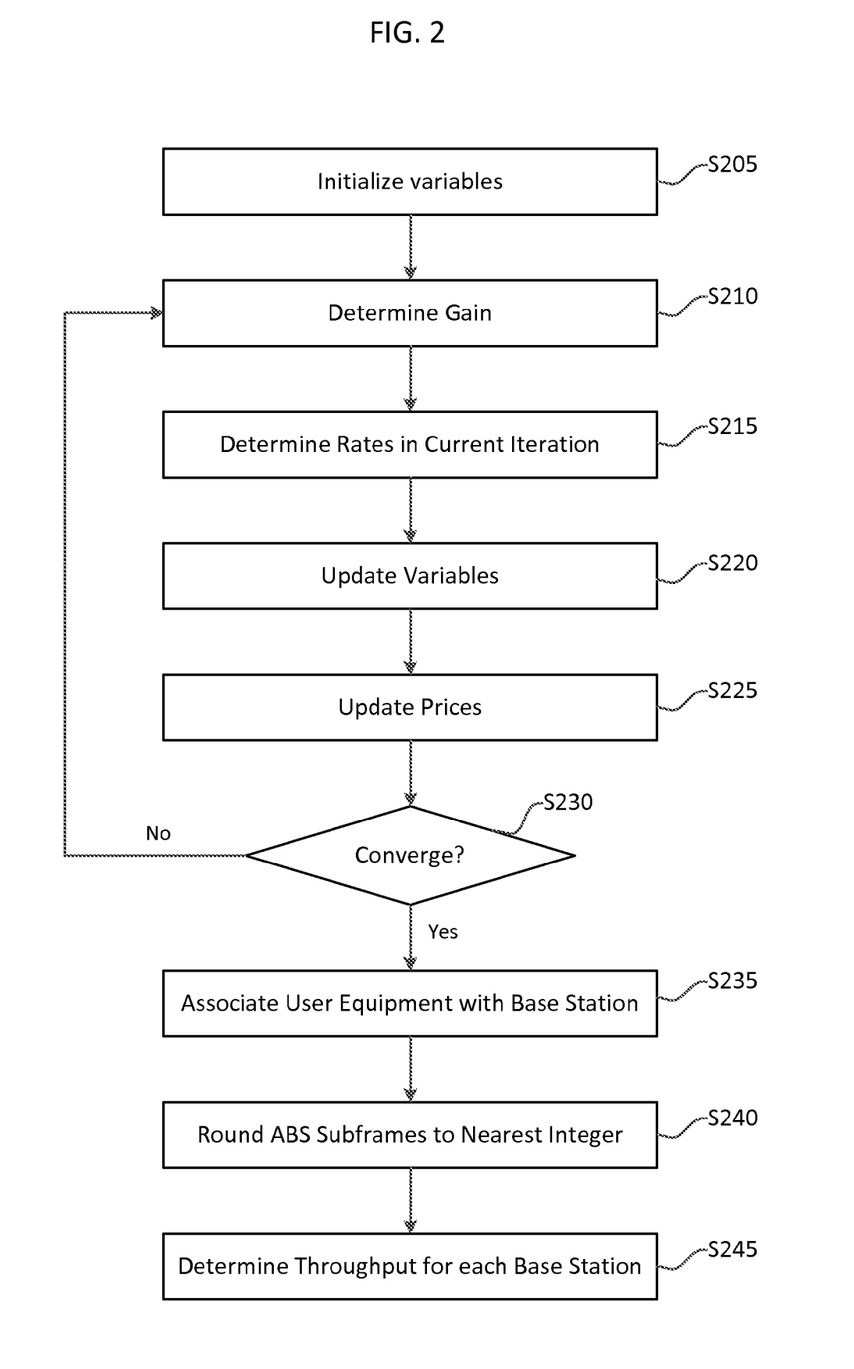
FIG. 2 illustrates a method of associating user equipment according to an example embodiment.

FIG. 2 illustrates a method of associating user equipment according to an example embodiment. The associating is of user equipment to a macro BS 110A, a small BS 110B and/or ABS.

Referring to FIG. 2, in step S205 a macro BS 110A initializes variables to arbitrary positive values. For example, the macro BS 110A initializes pr(m), pr(p), A_pr(p), I_pr(p,m), WTP(u), NAS(m), AS(p), x(u), y(u) and z(u), described above, to arbitrary positive values. The arbitrary positive values may be for example a same value, different values and/or a combination thereof. The arbitrary positive values are a design time choice based on empirical study.

In step S210 the macro BS 110A determines gain. For example, gain may be determined for each UE 105 for which the macro BS 110A is a candidate macro BS 110A (e.g., each UE 105 that may associate with the macro BS 110A). For example, the gain for each UE 105 may be calculated using equation 1 above. The overall gain of the macro may be determined using equation 3 above.

Alternatively and/or in addition, in step S210 a small BS 110B determines gain. For example, gain may be determined for each UE 105 for which the small BS 110B is a candidate (e.g., each UE 105 that may associate with the small BS 110B). For example, the gain for each UE 105 may be calculated using equation 2 above. The overall gain of the macro may be determined using equation 4 above.

In step S215 the macro BS 110A determines rates in the current iteration. For example, current airtimes (e.g., current x(u)) may be determined such that the current airtimes equal the number of subframes if the current iteration has a positive, maximum gain gain(u,m) for all UEs 105 that the macro BS 110A is a candidate macro BS 110A. For example, current ABS airtime may be determined such that the current ABS airtime equals the number of subframes for any UE 105 with a positive, maximum gain gain(u,p). For example, current non-ABS airtime may be determined such that the current non-ABS airtime equals the number of subframes for any UE 105 with a positive, maximum gain gain(u,p). If no such UE 105 exists for an iteration, the corresponding airtime may be set to zero.

Further, in step S215 the non-ABS subframes used by the macro BS 110A may equal the number of subframes if I_gain (m), determined in step S210, is greater than zero. The non-ABS subframes used by the macro BS 110A may equal zero otherwise. Still further, the ABS subframes used by the small BS 110B may equal the number of subframes if I_gain(p), determined in step S210, is greater than zero. The non-ABS subframes used by the small BS 110B may equal zero otherwise.

In step S220 the macro BS 110A updates the variables. For example, the macro BS 110A updates NAS(m), AS(p), x(u), y(u) and z(u) according to equations 5-9.

In step S225 the macro BS 110A updates the prices. For example, the one or more market prices may be updated based on a gradient descent plan. The gradient decent plan may reach a global maxima for a given network configuration. Gradient decent plans are known to those skilled in the art and will not be discussed further. The one or more updated market prices may be used during one or more iterations of a UE 105 association. For example, the macro BS 110A updates pr(m), pr(p), A_pr(p), I_pr(p,m) and WTP(u) according to equations 10-14.

One or more interfering macro cells 120 of the small cell 125 may offer a plurality of ABS based on a utility associated with a wireless communication system.

In step S230 the macro BS 110A determines if the ABSs offered by each macro BS 110A and a set of UEs 105 associated with each small BS 110B converge. For example the convergence may be based on utility associated with a wireless communication system.

For example, utility may be based on a logarithm of data rates of the plurality of user equipment based on user equipment location, a downlink Signal to Interference plus Noise Ratio (SINR) from macro cell 120 transmission and a downlink SINR from small cell transmission over ABS and non-ABS subframes. Utility may be determined so as to maximize $\Sigma_u \log(R_u)$ where $R_u$ is the throughput (e.g., data rate) attained by UE-u and the summation is carried over all UEs 105 in the entire network results. In other words, the macro BS 110A determines if the change from iteration to iteration of $\Sigma_u \log(R_u)$ is sufficiently small. Alternatively and/or in addition, utility may be based on a solution minimizing a sum of backlogs of a plurality of user equipment's associated with the wireless communication system. Utility is not limited to the above example. Utility may be based on a "value" of providing a certain measurable metric (e.g. throughput) of the wireless communication system.

Convergence may also include determining an average number of ABSs across a plurality or all iterations and determining an average throughput for each user equipment across the plurality or all iterations such that the average number of ABSs and the average throughput for each user equipment converges based on a fractional solution. The fractional solution may result in at least one of the plurality of user equipment being associated with both the macro cell 120 and the small cell 125 on a time-sharing basis. If the association converges, processing continues to step S235. Otherwise, processing returns to step S210.

In step S235 the macro BS 110A associates each of the UEs 105 with a base station. For example, if a UE 105 achieves a higher throughput (e.g., higher datarate) from a macro BS 110A than a small BS 110B, then the UE 105 is associated with the macro BS 110A. Otherwise, the UE 105 is associated with the small BS 110B. Further, associating each of the UEs 105 with a base station may include mapping the efficient (or even optimal) user equipment associations to one or more cell selection bias (CSB) value such that a new set of user equipment associations obtained after applying the cell selection bias approximates the efficient (or even optimal) user equipment associations.

In step S240 ABS subframes are rounded to the nearest integer value. For example, should the number of ABS subframes following step S230 be a fractional number or zero, the number of ABS subframes are set to the nearest positive integer value. For example, the fractional solution may be rounded to an integral solution without violating a set of feasibility constraints (e.g., interference constraints) and produces an integer ABS offering of user equipment associations to one of the small cell 125 and the macro cell 120.

In addition, according to example embodiments, if the association decisions in step S235 result in a non-zero number of UEs 105 assigned to a small BS 110B, then the ABS sub-frames of that small BS 110B is at least one. Further, after the rounding, if any of the interference constraints (described above) are violated, then either AS(p) or NAS(m) may be decremented by 1 for the associated assignment that violates the constraint.

In step S245 the macro BS 110A determines the throughput (e.g., datarate) for each base station (macro and small). The macro determines the throughput using any known technique. For example, the macro BS 110A may use the known weighted-proportional fair allocation technique for each of the resources among the associated UEs 105.

Mapping Small BS Associations to Cell Selection Bias (CSB) Values

The method described above with regard to FIG. 2 may more efficiently (or even optimize) ABS sub-frames and UE 105 association. However, UEs 105 associate to a suitable BS based on RSRP measurements from the BS. In order to achieve the desired association, suppose csb(c) is the cell section bias of cell c that could be macro cell or a small cell. Then UE-u associates with cell p(u) (denoting parent of UE-u) if:

$$p(u)=\arg\max\_c[csb(c)+RSRP(c,u)] \quad (15);$$

where, RSRP(c,u) is the RSRP of cell-c at UE-u; and arg max_c indicates the set of points of c is used for which equation 15 attains its maximum value.

Consider small cell p and let S(p,m) be a more efficient (or even optimal) set of UEs 105 that associated with small BS 110B p if the choice is between macro cell m and small cell p. Subsequently, $$RSRP(p,u)+csb(p)>RSRP(m,u)+csb(m) \quad (16);$$

for the UE-u element of S(p,m)
As a result, $$csb(p)-csb(m)>\text{Delta}(m,p) \quad (17);$$

where Delta(m,p) is defined as, $$\text{Delta}(m,p)=\max\_u[RSRP(m,u)-RSRP(p,u)] \quad (18);$$

The above condition should hold true for all interfering small BS 110B, macro BS 110A pairs in order to ensure that all UE(u) in S(p,m) associate to small BS 110B p. Accordingly, values of CSB's so that equation 17 is satisfied for all interfering small BS 110B, macro BS 110A pairs are found.

As is known, an interference graph associated with macro BSs and small BSs may be represented as a bipartite graph with nodes of the left-part denoting small BSs and nodes on the right-part denoting macro BSs. Further, as is known, a bipartite graph may be considered as a tree graph. Accordingly, known tree searches may be used. For example, a breadth-first search tree (forest) search may be used. For example, the breadth-first search tree of the interference graph with macro BS 110A at the root of each tree of the forest may be used. For example, this tree may have macro BS 110A nodes at the even-level and small BS 110B nodes at the odd-level.

According to example embodiments, the tree may be denoted as T(BFS). Further, let V(l) represent the nodes belonging to level-l of T(BFS). According to example embodiments, values of CSB's so that equation 17 is satisfied for all interfering small BS 110B, macro BS 110A pairs may be determined as follows:

Start with level l=0 of T(BFS) and for all macro BSs 'm' at level '1', set csb(m)=0. Evaluate each node (e.g., repeated until all macro cells (nodes) and small cells (nodes) are visited in T(BFS)) at the next level, such that l becoming l+1 results in one of two solutions:

for all small BS's 'p' in level-l, set csb(p) equal to $$\text{Max}\_\{\text{all macro 'm' in level-}(l-1)\}[csb(m)+\text{Delta}(p,m)] \quad (19);$$

where, l is odd (e.g., nodes in T(BFS) at this level are small cells); and
for all macro BS's 'm' in level-l, set csb(m) equal to $$-1.0*\text{Max}\_\{\text{all small 'p' in level-}(l-1)\}[-1.0*csb(p)+\text{Delta}(p,m)] \quad (20);$$

where, l is even (e.g., nodes in T(BFS) at this level are macro cells).

The above example embodiment is to illustrate one example of the mapping of small BS associations to cell selection bias (CSB) values. Example embodiments are not limited thereto.

Figure 3:
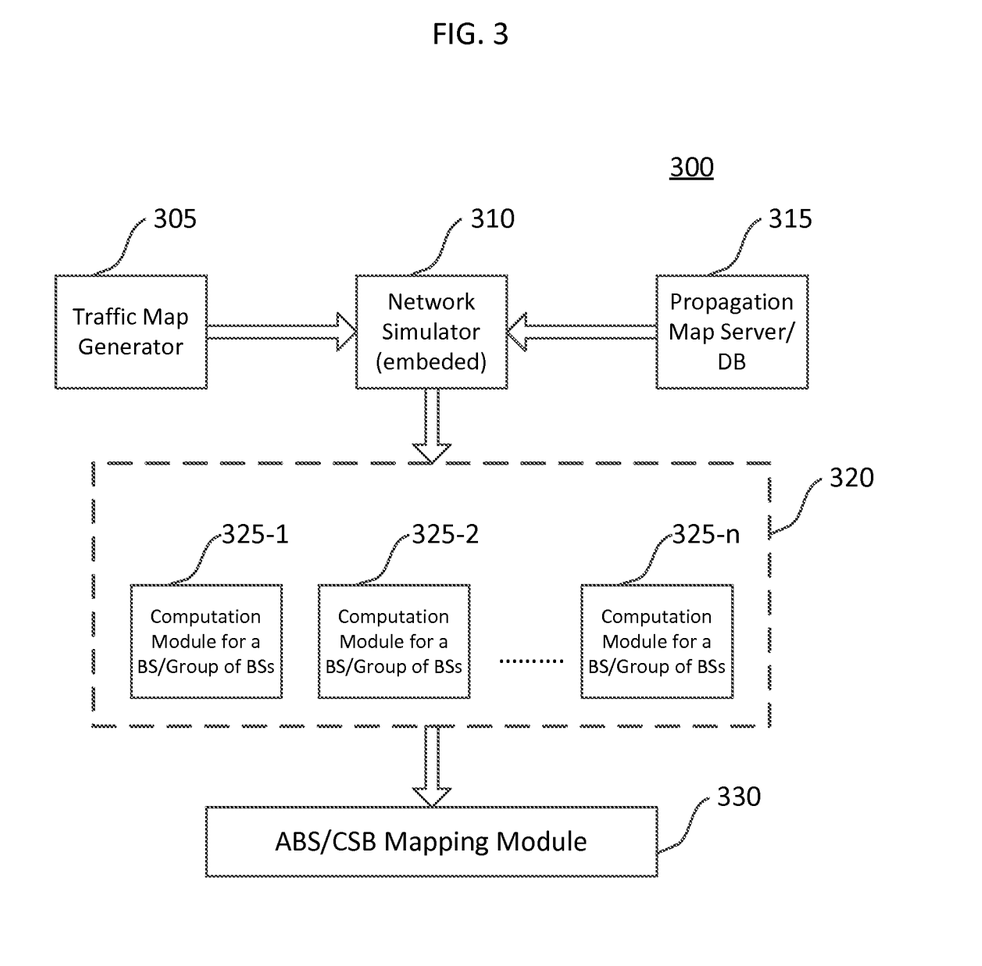
FIG. 3 illustrates a system implementing the method of FIG. 2 according to an example embodiment.

Example Implementations
Radio Network Planning of LTE HetNet Using a Network Simulator FIG. 3 illustrates a system implementing the method of FIG. 2 according to an example embodiment. As shown in FIG. 3, the system 300 includes a traffic map generator 305, a network simulator 310, a propagation map server/database 315, a parallel computation module 320 and an ABS/CSB mapping module 330. The parallel computation module 320 may include one or more computation modules for a BS or group of BSs 325.

The traffic map generator 305, the network simulator 310, the propagation map server/database 315, the parallel computation module 320, the ABS/CSB mapping module 330 and the one or more computation modules for a BS or group of BSs 325 may be implemented as a computer program for use on a computer system (e.g., a server or a processing device associated with a base station, a base station controller or a radio network controller), the computer program being, for example, a series of computer instructions, code segments or program segments stored on a tangible or non-transitory data recording medium (computer readable medium), such as a fixed disk. The series of computer instructions, code segments or program segments may constitute all or part of the functionality of the elements described above, and may also be stored in any memory device, volatile or non-volatile, such as semiconductor, magnetic, optical or other memory device.

The system 300 may be incorporated into one or more macro base stations. Alternatively and/or in addition the system 300 may be incorporated into one or more core network elements (e.g., a base station controller or a radio network controller).

The traffic map generator 305 and the propagation map server/database 315 are generally known to those skilled in the art. The traffic map generator 305 and the propagation map server/database 315 may be configured to account for network load and propagation characteristics such as, for example, traffic intensity maps. Each may be a database or server that may be queried to acquire up to date (time) information regarding the current network load and propagation characteristics. In general, system 300 does not require exact location traffic hot-spot and load. For example, the traffic intensity maps may be coarse grained and made available on a per-cell basis for different times in a day.

The network simulator 310 may be a commercial network simulator (e.g., commercially available embedded network simulator) that is used to generate inputs required by an enhanced inter cell interference coordination (eICIC) algorithm as modified by the methods according to one or more example embodiments. The network simulator 310 may use the traffic map, propagation map, and BS locations to generate multiple snapshots of UE 105 locations. Network simulator 310 may use methods according to one or more example embodiments (e.g., described above with regard to FIG. 3) and may perform ABS/CSB determinations for each of these snapshots and average the output.

The computation modules for a BS or group of BSs 325 may include one or more processor configured to execute a solution for one or more subsets of the overall UE 105 association method or problem. For example, UE 105's association may be based on geographic or other location characteristics. For example, the computational module 325-1 may include a computation of ABS and CSB for a group of neighboring BSs and communicate to another computational module 325-2, quantities that are used to establish an a more efficient (or even optimum) solution across a multitude of computational modules. The solution may be established with the aid of the ABS/CSB mapping module 330.

The ABS/CSB mapping module 330 may determine the optimal ABS value and which UEs 105 associate with small cells. The computation may be broken down into different processes (either on the same computing server or separate) with each process responsible for a group of BSs. The processors communicate with each other through simple messages, thus ensuring that the final solution accounts for the entire network. The details of which are described above with regard to FIG. 3.

Figure 4:
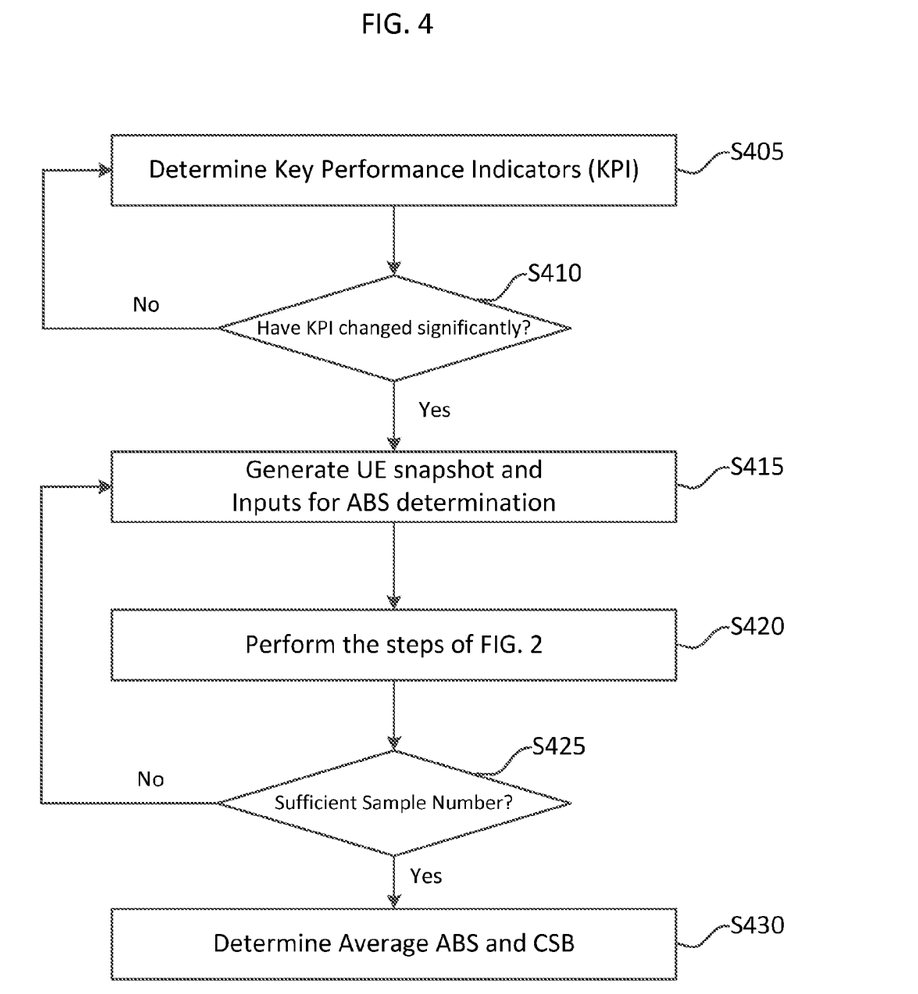
FIG. 4 illustrates a method associated with the system of FIG. 3 according to an example embodiment.

FIG. 4 illustrates a method associated with the system of FIG. 3 according to an example embodiment. Referring to FIG. 4, in step S405 the macro BS 110A determines key performance indicators (KPI). For example, the macro BS 110A may establish a radio resource control (RRC) link in order to request KPI from one or more cells (macro or small) in a time based manner (e.g., once an hour). For example, the KPI may include reference signal received power (RSRP), reference signal received quality (RSRQ), carrier received signal strength indicator (RSSI), cell aggregate throughput, cell edge user throughput and the like.

In step S410 the macro BS 110A determines if KPI has changed significantly. For example, the macro BS 110A may compare each of the KPI to a past KPI to determine a delta. If the delta is more than a threshold value the change may be determined to be significant. The change may be determined to be significant if one KPI is greater than the threshold. Alternatively, more than one KPI delta may exceed the threshold for the change to be significant. Another alternative may be that there are multiple thresholds for each KPI. For example, a lower delta indicates a threshold for multiple KPI requirements for significant change to be indicated and a higher threshold indicates the KPI (with the higher delta) indicates a significant change. If KPI has changed significantly processing continues to step S415. Otherwise, processing returns to step S405.

In step S415 the macro BS 110A generates user equipment (UE) snapshots and inputs for ABS determination. For example, the macro BS 110A determines values for initializing pr(m), pr(p), A_pr(p), I_pr(p,m), WTP(u), NAS(m), AS(p), x(u), y(u) and z(u) as required for step S205. For example, the determined values may be associated with stored values. For example the stored values may be from a previous determination of ABS and CSB. For example, cell performance indicators may be determined. For example the cell performance indicators may be one or more PKI (e.g., RSRP). For example, UE-location snapshots are generated based on traffic maps and propagation maps. Further, the UE 105 snapshots (e.g., UE 105 location) may be from multiple systems. Each sample UE-locations may be converted into downlink PHY-layer rate between UE 105 and Macro, UE and Pico with and without ABS.

In step S420 the steps associated with the method of FIG. 2 are performed. For example, for each UE 105 snapshot, the method of FIG. 2 is executed. For example, each step and/or portions thereof may be segregated into multiple computers, each responsible for a given set of BSs (e.g., BS prices and associated UEs 105). The segregation may require price exchange between interfering small BSs and macro BSs in different clusters which may be accomplished using messaging standards.

In step S425 the macro BS 110A determines if a sufficient number of UE 105 snapshots have been used to generate ABS and CSB data. The sufficient number may be a threshold number and may be a design time determination. If a sufficient number of UE 105 snapshots have been used processing continues to step S430. Otherwise, processing returns to step S415. In step S430 ABS and CSB results are averaged over all UE snapshot samples.

Example Implementations
Self-Organizing Networks

Figure 5:
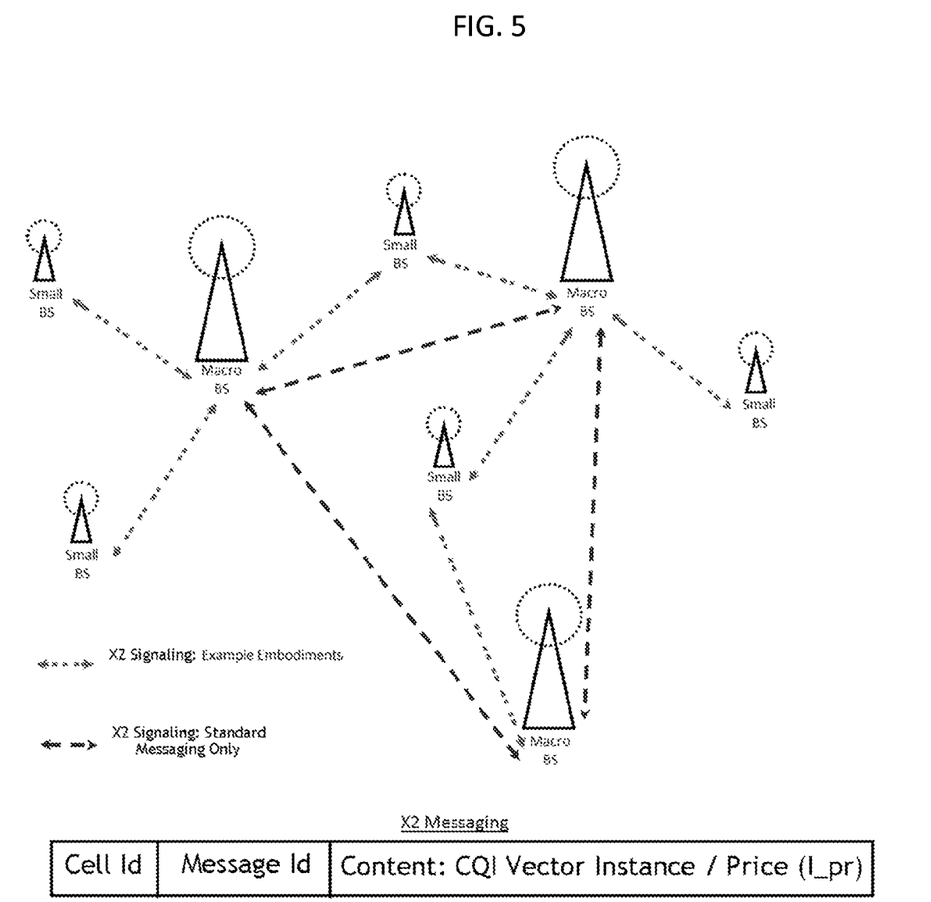
FIG. 5 illustrates a system implementing the method of FIG. 2 according to an example embodiment.

FIG. 5 illustrates a system implementing the method of FIG. 2 according to an example embodiment. As shown in FIG. 5, the system includes several small base stations and several macro base stations. Small base stations and macro base stations are described above in more detail and will not be discussed further for the sake of brevity. The system of FIG. 5 may be organized as a self-organizing network (SON). A SON is generally known to implement a 'plug-and-play' paradigm in the way that new base stations shall automatically be configured and integrated into the network. This infers both connectivity establishment, and download of configuration parameters and software. Generally, base station parameters may be regularly adjusted based on both base station and mobile station observations.

In order to make use of blank or almost blank subframes (ABSs) effective, signaling is provided from the macro cell 120 to the small cell 125 across the corresponding backhaul interface, known in LTE as the "X2" interface. For LTE Release 10, it has been agreed that this X2 signaling will take the form of a coordination bitmap to indicate the ABS pattern (for example with each bit corresponding to one subframe in a series of subframes, with the value of the bit indicating whether the subframe is an ABS or not). Such signaling can help the small cell 125 to schedule data transmissions in the small cell 125 appropriately to avoid interference (e.g. by scheduling transmissions to UEs 105 near the edge of the small cell 125 during ABSs), and to signal to the UEs 105 the subframes which should have low macrocellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link)

FIG. 5 further illustrates an X2 message according example embodiments. As shown in FIG. 5, the message may include three fields. The fields may include Cell Id, Message Id and CQI Vector Instance per Price (I_pr). The message may be communicated as illustrated in FIG. 5.

Example embodiments are configured to provide additional X2 messages between an interfered small cell 125 and an interfering macro cell 120. Each message may include (i) Cell id of the sending BS, (ii) a unique message ids similar to the known Escape_To_Proprietary message that may be either the current value of I_pr or the interference price used in our algorithm, or the agreed upon CQI vector over which the algorithm has to run, and (iii) the price value of 2 bytes or CQI vector values.

Initially, the small cells 125 and macro cells 120 agree upon a UE CQI vector to be used for running ABS optimization. Each Macro maintains the macro prices and WTPs of UEs 105 for which the macro cell 120 is a candidate. Each small cell 125 maintains small cell prices and interference prices I_pr(p,m) for each interfering macro cell 120. The prices are updated as described above (see step S225).

The new values of I_pr are sent from small cell 125 to interfering macro cells 120 over the X2 interface according to example embodiments as described above. Each macro cell 120 updates ABS offerings and UE 105 airtimes using the prices based on the method of FIG. 2 described above. Sending the new values of I_pr, updating ABS offerings and UE 105 airtimes may be repeated as necessary.

CONCLUSION

Example embodiments provide cell specific almost blank subframes (ABS) and Cell Selection Bias (CSB) value configuration. Example embodiments may determine cell specific configurations. By contrast, known solutions determine a single network wide ABS and CSB value which may be less advantageous because different cells may have different traffic and propagation maps. Example embodiments account for the dependence of propagation map, traffic map/hotspot location on the ABS and CSB. Because traffic maps may be different at different times of the day, example embodiments may determine configurations at different times of the day. Example embodiments scale linearly with the number of BSs. Therefore, example embodiments are less complex than the known solutions. This property enables the solution to be applicable to large cities (e.g., NYC) where there could be tens of thousands of BSs fed into a planning tool.

Example embodiments take into consideration an entire network instead of each macro cell 120 in isolation. Therefore, example embodiments account for configurations in one cell affecting an adjacent cell's performance which could cause a ripple effect throughout the network. In example embodiments, the CSB setting may be dependent on ABS and vice-versa. Therefore, ABS and CSB may be determined jointly or simultaneously and not independently.

The use of small cells 125 may theoretically result in increased spectral efficiency. Example embodiments described above provide a HetNet deployment to realize the promised gains. For example, example embodiments provide association rules for deciding which UEs 105 get associated with small cells 125. Further, example embodiments provide solutions as to how macro and small BSs time-share spectrum so that UEs 105 associated with small cells 125 achieve a high throughput without impacting the macro cell 120 performance.

In addition, wireless networks (e.g., wireless network 100) may be highly dynamic. Traffic load, hot-spot locations, SINR distribution in different cells, application mix may be dynamic and each of these directly impact the UE 105 association and time-sharing of spectrum between macro cells 120 and small cells 125. Further, configurations in cells (e.g., macro cell 120 and small cell 125) of the network may affect adjacent cells and this could have a ripple effect on throughput of the network. Example embodiments take into consideration the network in its entirety when associating UEs 105 to macro cells 120, small cells 125 and ABSs should consider.

The choice of ABS and CSB may impact (a) a MAC scheduler associated with the network (e.g., wireless network 100) and (b) a UE's 105 choice of BS during association as shown in the above figure. According to example embodiments a more efficient (or even optimal) choice of ABS offered by a macro BS 110A may be coupled with which UEs 105 are associated with macro cells 120 and which UEs 105 are associated with small cells 125. Accordingly, according to example embodiments, ABS selection and UE 105 association may be determined jointly. In addition, for a small BS 110B to transmit data over an ABS subframe, example embodiments may provide that all the interfering macro BSs 110A of the small BS 110B are silent over that particular ABS subframe.

Although the above example embodiments describe the steps as being performed by the network entities illustrated in FIG. 1A (e.g., macro BSs), example embodiments are not limited thereto. For example, the above method steps may be performed by alternative network components.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for wireless communication, comprising:
   associating a user equipment with one of a macro cell and a small cell using one or more almost blank subframes (ABS) offered by the macro cell, one or more market prices related to associating with the macro cell and the small cell, and a utility that accounts for user equipment throughput based on potential associations.

2. The method of claim 1, prior to the associating step, further comprising:
   offering, by one or more interfering macro cells of the small cell, a plurality of ABS based on the utility.

3. The method of claim 2, wherein the utility is based on a logarithm of data rates of a plurality of user equipment and user equipment location, a downlink Signal to Interference plus Noise Ratio (SINR) from macro cell transmission and a downlink SINR from small cell transmission over ABS and non-ABS subframes.

4. The method of claim 3, wherein
   the logarithm is $\Sigma_u \log(R_u)$;
   u is the user equipment element of the plurality of user equipment being summed;
   $R_u$ is a throughput associated with user equipment (u);
   the throughput is based on the user equipment location, the downlink SINR from macro cell transmission and the downlink SINR from small cell transmission over ABS and non-ABS subframes; and
   $\Sigma_u \log(R_u)$ is maximized over the plurality of user equipment.

5. The method of claim 2, wherein the utility is based on a solution minimizing a sum of backlogs of a plurality of user equipment.

6. The method of claim 1, wherein
   the associating is iterated a number of times,
   during each iteration the one or more market prices are updated based on a gradient descent plan, and
   the associating uses the one or more market prices of the current iteration.

7. The method of claim 6, wherein the gradient decent plan reaches a global maxima for a given network configuration.

8. The method of claim 7, further comprising:
   determining an average number of ABSs across all iterations,
   determining an average throughput for each user equipment across all iterations, wherein the average number of ABSs and the average throughput for each user equipment converges based on a fractional solution.

9. The method of claim 8 wherein the fractional solution results in at least one of the plurality of user equipment being associated with both the macro cell and the small cell on a time-sharing basis.

10. The method of claim 9, wherein the fractional solution is rounded to an integral solution without violating a set of feasibility constraints and produces an integer ABS offering of user equipment associations to one of the small cell and the macro cell.

11. The method of claim 10, further comprising:
    mapping the user equipment associations to one or more cell selection bias value such that a new set of user equipment associations obtained after applying the cell selection bias is approximates the user equipment associations.

12. The method of claim 1, wherein one of the one or more market prices includes a price the user equipment pays to associate with the small cell.

13. The method of claim 1, wherein one of the one or more market prices includes a price the user equipment pays to associate with the macro cell.

14. The method of claim 1, wherein one of the one or more market prices includes a price the user equipment pays to use the one or more ABS.

15. The method of claim 1, wherein one of the one or more market prices includes a price associated with one or more interfering macro cells.

16. The method of claim 1, wherein one of the one or more market prices includes a price the small cell pays for the macro cell to remain silent during a subframe period.

17. The method of claim 1, wherein one of the one or more market prices includes a price the user equipment is willing to pay for associating with one of the macro cell and the small cell.

* * * * *

UNITED STATES PATENT AND TRADEMARK OFFICE
CERTIFICATE OF CORRECTION

PATENT NO. : 8,559,917 B1
APPLICATION NO. : 13/435388
DATED : October 15, 2013
INVENTOR(S) : Supratim Deb et al.

It is certified that error appears in the above-identified patent and that said Letters Patent is hereby corrected as shown below:

On the title page, insert item (65)

--(65)  Prior Publication Data

US 2013-0260712 A1    October 3, 2013--

Signed and Sealed this
Fourth Day of March, 2014

Michelle K. Lee
*Deputy Director of the United States Patent and Trademark Office*